United States Patent
Jiang

(10) Patent No.: US 10,733,112 B2
(45) Date of Patent: Aug. 4, 2020

(54) METHOD AND APPARATUS FOR HARDWARE VIRTUALIZATION

(71) Applicant: ALIBABA GROUP HOLDING LIMITED, George Town, Grand Cayman (KY)

(72) Inventor: Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 154 days.

(21) Appl. No.: 15/626,044

(22) Filed: Jun. 16, 2017

(65) Prior Publication Data
US 2018/0365160 A1 Dec. 20, 2018

(51) Int. Cl.
*G06F 12/109* (2016.01)
*G06F 9/455* (2018.01)

(52) U.S. Cl.
CPC ........ *G06F 12/109* (2013.01); *G06F 9/45558* (2013.01); *G06F 2009/45579* (2013.01); *G06F 2009/45583* (2013.01); *G06F 2212/152* (2013.01); *G06F 2212/657* (2013.01)

(58) Field of Classification Search
CPC ............... G06F 12/109; G06F 9/45558; G06F 2212/152; G06F 2212/167; G06F 2009/45579; G06F 2009/45583
See application file for complete search history.

(56) References Cited

U.S. PATENT DOCUMENTS

| 6,298,390 | B1* | 10/2001 | Matena ............... G06F 12/0866 719/315 |
| 10,191,864 | B1* | 1/2019 | Bshara .................. G06F 13/105 |
| 2006/0139360 | A1 | 6/2006 | Panesar et al. |
| 2011/0179214 | A1* | 7/2011 | Goggin .................. G06F 3/061 711/6 |
| 2014/0280674 | A1* | 9/2014 | Arramreddy ........... H04L 49/90 709/213 |

(Continued)

OTHER PUBLICATIONS

Jones, Tlm. System Emulation with QEMU [online]. International Business Machines Corporation, 2007 [retrieved on Jul. 20, 2013]. Retrieved from the Internet: <https://web.archive.org/web/20130720074636/http://www.ibm.com/developerworks/linux/library/l-qemu/>. (Year: 2007).*

(Continued)

*Primary Examiner* — Tracy A Warren
(74) *Attorney, Agent, or Firm* — Finnegan, Henderson, Farabow, Garrett & Dunner, LLP

(57) ABSTRACT

An apparatus for operating an input/output (I/O) interface in a virtual machine is provided. The apparatus is configured to: map a first portion of a memory device to a configuration space of an I/O interface; obtain a first mapping table that maps a set of host space virtual addresses to a first set of physical addresses associated with the first portion of the memory device; obtain a second mapping table that maps a second set of physical addresses associated with a second portion of the memory device accessible by a virtual machine to the set of host space virtual addresses; generate a third mapping table that maps the second set of physical addresses to the first set of physical addresses; and provide the third mapping table to a device driver operating in the virtual machine, to enable the device driver to access the configuration space of the I/O interface.

20 Claims, 9 Drawing Sheets

(56) References Cited

U.S. PATENT DOCUMENTS

| | | | | |
|---|---|---|---|---|
| 2014/0379955 | A1 | 12/2014 | Dong et al. | |
| 2016/0085684 | A1* | 3/2016 | Borikar | G06F 12/109 711/209 |
| 2016/0179686 | A1* | 6/2016 | Ju | G06F 3/0604 711/130 |
| 2016/0246730 | A1 | 8/2016 | Gandhi et al. | |
| 2017/0161090 | A1* | 6/2017 | Kodama | G06F 9/45558 |
| 2017/0357579 | A1* | 12/2017 | Tsirkin | G06F 12/1009 |

OTHER PUBLICATIONS

Motika, G. and S. Weiss, "Virtio network paravirtualization driver: Implementation and performance of a de-facto standard," Computer Standards & Interfaces, 34 (2012) 36-47.*

Karger, P.A. and D.R. Safford, "I/O Virtual Machine Monitors: Security and Performance Issues," IEEE Security & Privacy, 2008.*

R. Russell, "virtio: Towards a De-Facto Standard for Virtual I/O Devices," ACM SIGOPS Operating System Review—Research and developments in the Linux kernel, 2008, available https://ozlabs.org/~rusty/virtio-spec/virtio-paper.pdf.*

PCT International Search Report dated Aug. 31, 2018, issued in corresponding International Application No. PCT/US2018/037863 (3 pgs.).

PCT International Written Opinion dated Aug. 31, 2018, issued in corresponding International Application No. PCT/US2018/037863 (13 pgs.).

Wang, Xiaolin; "Selective Hardware/Software Memory Virtualization"; in: VEE '11 Proceedings of the $7^{th}$ ACM SIGPLAN/SIGOPS international conference on Virtual execution environments, Mar. 9-11, 2011 (20 pgs.).

Wang, Xiaolin; "virtio: towards a de-facto standard for virtual I/O devices"; in: ACM SIGOPS Operating Systems Review, Jan. 2008 [online] [retrieved on Oct. 10, 2018 from <URL: https://dl.acm.org/citation.cfm?id=1400108>, Abstract only (1 pg.).

* cited by examiner

METHOD AND APPARATUS FOR HARDWARE VIRTUALIZATION

TECHNICAL FIELD

The present disclosure generally relates to the field of computer architecture, and more particularly, to a method and apparatus for virtualization.

BACKGROUND

Virtualization generally refers to a method of logically dividing system resources among a plurality of software applications. In a virtualized environment, one or more virtual machines are created. A virtual machine can operate like a computer system emulator and can execute a set of software instructions. Typically a virtual machine operates a software stack including a guest operating system, and one or more guest software applications running on top of the operating system. The guest operating system provides software frontend drivers that can communicate with backend drivers hosted in a hypervisor to access a set of physical resources. The hypervisor can also regulate the access of the physical resources by, for example, managing the access rights to the system resources, transporting access request and requested resources between the virtual machines and the system that provides the requested resources, etc.

SUMMARY

Embodiments of the present disclosure provide an apparatus for operating an input/output (I/O) interface in a virtual machine, the apparatus comprising one or more memory devices that stores a set of instructions, and one or more hardware processors configured to execute the set of instructions to: map a first portion of the one or more memory devices to a configuration space of an I/O interface; obtain a first mapping table that maps a set of host space virtual addresses to a first set of physical addresses associated with the first portion of the one or more memory devices; obtain a second mapping table that maps a second set of physical addresses associated with a second portion of the one or more memory devices to the set of host space virtual addresses, wherein the second portion of the one or more memory devices is accessible by a virtual machine; generate a third mapping table that maps the second set of physical addresses to the first set of physical addresses; and provide the third mapping table to a device driver operating in the virtual machine, wherein the third mapping table enables the device driver to access the configuration space of the I/O interface.

Embodiments of the present disclosure also provide a method for operating an input/output (I/O) interface in a virtual machine, the method comprising: mapping a first portion of a memory device to a configuration space of an I/O interface; obtaining a first mapping table that maps a set of host space virtual addresses to a first set of physical addresses associated with the first portion of the memory device; obtaining a second mapping table that maps a second set of physical addresses associated with a second portion of the memory device to the set of host space virtual addresses, wherein the second portion of the memory device is accessible by a virtual machine; generating a third mapping table that maps the second set of physical addresses to the first set of physical addresses; and providing the third mapping table to a device driver operating in the virtual machine, wherein the third mapping table enables the device driver to access the configuration space of the I/O interface.

Embodiments of the present disclosure also provide a non-transitory computer readable medium that stores instructions that are executable by one or more processors of an apparatus to perform a method for operating an input/output (I/O) interface in a virtual machine, the method comprising: mapping a first portion of a memory device to a configuration space of an I/O interface; obtaining a first mapping table that maps a set of host space virtual addresses to a first set of physical addresses associated with the first portion of the memory device; obtaining a second mapping table that maps a second set of physical addresses associated with a second portion of the memory device to the set of host space virtual addresses, wherein the second portion of the memory device is accessible by a virtual machine; generating a third mapping table that maps the second set of physical addresses to the first set of physical addresses; and providing the third mapping table to a device driver operating in the virtual machine, wherein the third mapping table enables the device driver to access the configuration space of the I/O interface.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide an apparatus for providing one or more virtualized computing environments. The apparatus is communicatively coupled with a hardware system capable of performing a set of functions. The hardware system comprises a configuration space, which comprises a set of hardware registers and a memory device and stores a set of configuration data for configuring the performance of the set of functions. The apparatus is associated with a host space in a memory device, and stores a mapping table that maps a set of virtual memory addresses accessible to the virtual machine to the configuration space via the host space. The mapping table enables a software application operating on the virtual machine to directly access the hardware system by performing one or more memory read/write operations to the set of virtual memory addresses.

By providing direct access to a hardware system, embodiments of the present disclosure enable a software application operating on a virtual machine to access the resources provided by the hardware system more efficiently. As a result, the performance of the software application, as well as the performance of the virtualized environment in which the software application operates, can improve. Moreover, the virtual machine can operate a generic and standard device driver capable of accessing the hardware system. As a result, the deployment and maintenance of the virtualized environment can be performed more efficiently as well.

Figure 1A:
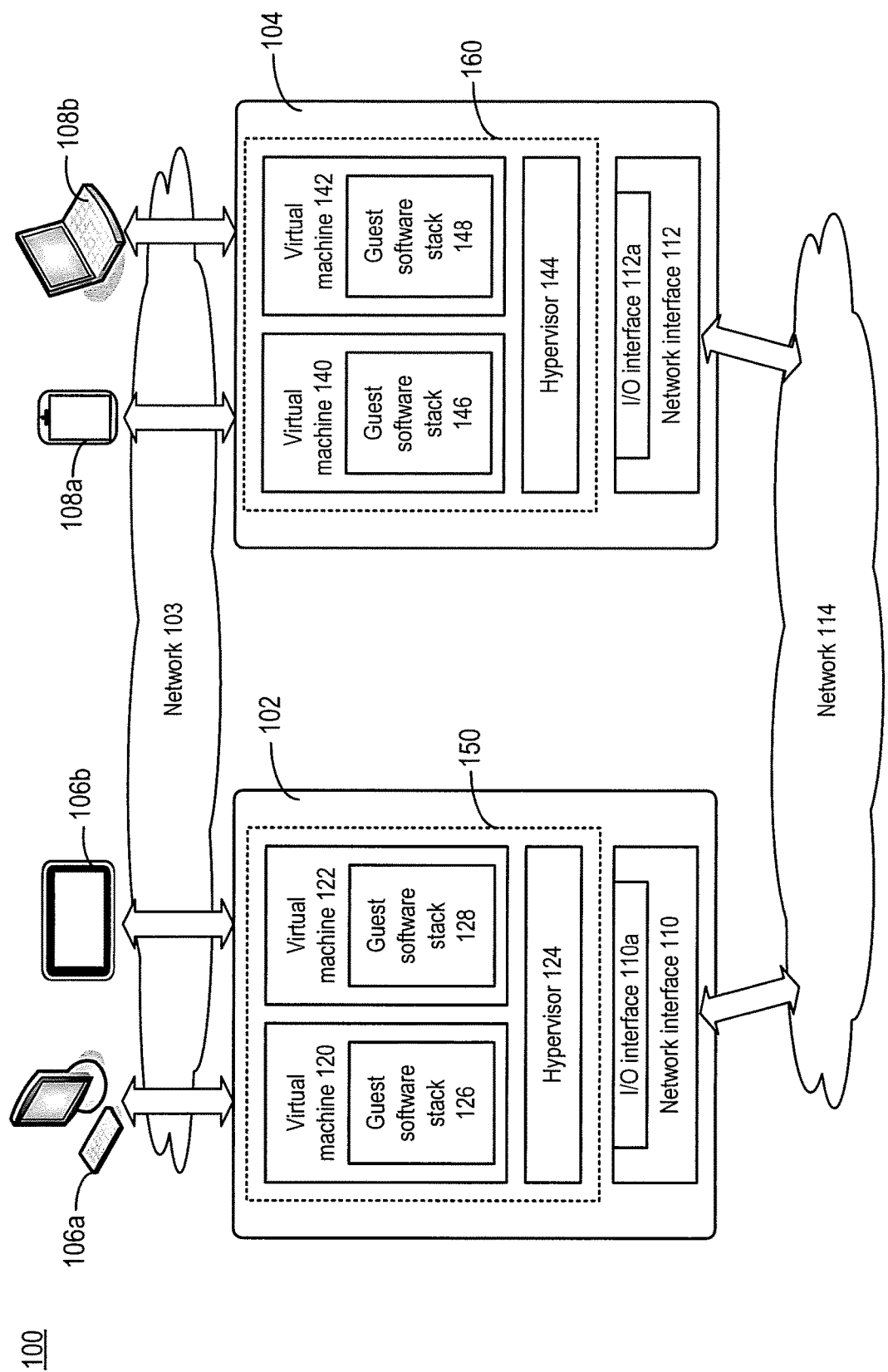
FIGS. 1A-1B are diagrams illustrating an exemplary virtualized environment in which embodiments of the present disclosure can be used.

Reference is now made to FIG. 1A, which illustrates a virtualized environment 100 in which embodiments of the present disclosure can be used. As shown in FIG. 1A, virtualized environment 100 includes a host machine 102 and a host machine 104. Host machine 102 may be communicatively coupled with a user device 106a and a user device 106b via network 103, whereas host machine 104 may also be communicatively coupled with a user device 108a and 108b via network 103. Each of host machines 102 and 104 can be a server and can provide virtualized computing and networking resources to user devices 106a, 106b, 108a, and 108b. For example, host machines 102 and 104 operates a chat messaging software application that provides the chat messaging session between user devices 106a and 108a. Host machines 102 and 104 also operates a Voice-over-IP (VoIP) software application that provides a VoIP session between user devices 106b and 108b. Users can log into host machines 102 and 104 to access the chat messaging software application and the VoIP software application via the user devices. Host machines 102 and 104 can provide a virtualized environment by, for example, allowing user devices 106a and 108a to access the chat messaging software application but not the VoIP software application. Moreover, host machines 102 and 104 also allow user devices 106b and 108b to access the VoIP software application, but not the chat messaging software application.

As shown in FIG. 1A, host machines 102 and 104 further include, respectively, a network interface 110 and a network interface 112. Network interfaces 110 and 112 can be configured to provide packetized data transmission over network 114 to support the chat messaging session and the VoIP session according to predetermined network protocols, such as Transmission Control Protocol/Internet Protocol (TCP/IP), Real-Time Transport Protocol (RTP), RTP Control Protocol (RTCP), etc. Both of network interfaces 110 and 112 further comprises, respectively, an I/O (input/output) interface 110a and an I/O interface 112a. Network interfaces 110 and 112 can interface with other components of, respectively, host machines 102 and 104 via the I/O interface. The I/O interface can be based on a parallel interface (e.g., Peripheral Component Interconnect (PCI)), a serial interface (e.g., Peripheral Component Interconnect Express (PCIe)), etc. As an illustrative example, network interfaces 110 and 112 can be a PCIe network interface card (NIC) connected to host machines 102 and 104 via a PCIe interface.

To provide a virtualized environment to user devices 106a and 106b for accessing I/O interface 110a (and the networking resources provided by network interface 110), host machine 102 hosts a virtual machine 120, a virtual machine 122, and a hypervisor 124 that regulates the access of I/O interface 110a by virtual machines 120 and 122. Similarly, to provide a virtualized environment to user devices 108a and 108b for accessing I/O interface 112a (and the physical resources provided by network interface 112), host machine 104 also hosts a virtual machine 140, a virtual machine 142, and a hypervisor 144 that regulates the access of I/O interface 112a by virtual machines 140 and 142.

Each of the virtual machines operates a guest software stack to provide a user device access to the I/O interface. For example, virtual machine 120 can operate a guest software stack 126, virtual machine 122 can operate a guest software stack 128, virtual machine 140 can operate a guest software stack 146, whereas virtual machine 142 can operate a guest software stack 148. Each of the guest software stacks can include a guest operating system, as well as one or more software applications that operate on top of the guest operating system to access the I/O interfaces and the network interfaces. For example, the aforementioned chat messaging software application can be included in guest software stacks 126 and 146, whereas the aforementioned VoIP software application can be included in guest software stacks 128 and 148.

Each of guest software stacks 126, 128, 146, and 148 also includes a device driver capable of accessing I/O interface 110a or 112a. The device driver can be a generic driver that is a part of a standard build of the guest operating system. The device driver can be, for example, a VirtI/O Frontend Driver. The guest operating system included in the guest software stacks can be, for example, Microsoft™ Windows™, Ubuntu™, Red Hat™ Enterprise Linux™ (RHEL), etc. As to be discussed below, a hypervisor (e.g., hypervisor 124, hypervisor 144, etc.) can be a type-1 or type-2 hypervisor and can regulate access of the I/O interface by the device driver, which in turn can regulate the access of the I/O interface by the guest software stack that includes the device driver. For example, hypervisor 124 can control which of the chat messaging application (operating in virtual machine 120) and the VoIP application (operating in virtual machine 122) can use I/O interface 110a (and network interface 110) to transmit data over network 114. Likewise, hypervisor 144 can also control which of the chat messaging application (operating in virtual machine 140) and the VoIP application (operating in virtual machine 142) can use I/O interface 112a (and network interface 112) to transmit data over network 114.

Each of host machines 102 and 104 includes, respectively, a memory device 150 and a memory device 160. The aforementioned virtual machines, guest software stacks, and hypervisors can be software codes stored in the memory devices 150 and 160, and executed by one or more hardware processors (not shown in FIG. 1A), to provide the aforementioned virtualized environment, as well as the chat messaging session and the VoIP session, for the user devices.

Each of memory devices 150 and 160 also provides memory spaces to be used by the virtual machines, guest software stacks, and the hypervisors when operating on host machines 102 and 104, as well as by the I/O interfaces.

Figure 1B:
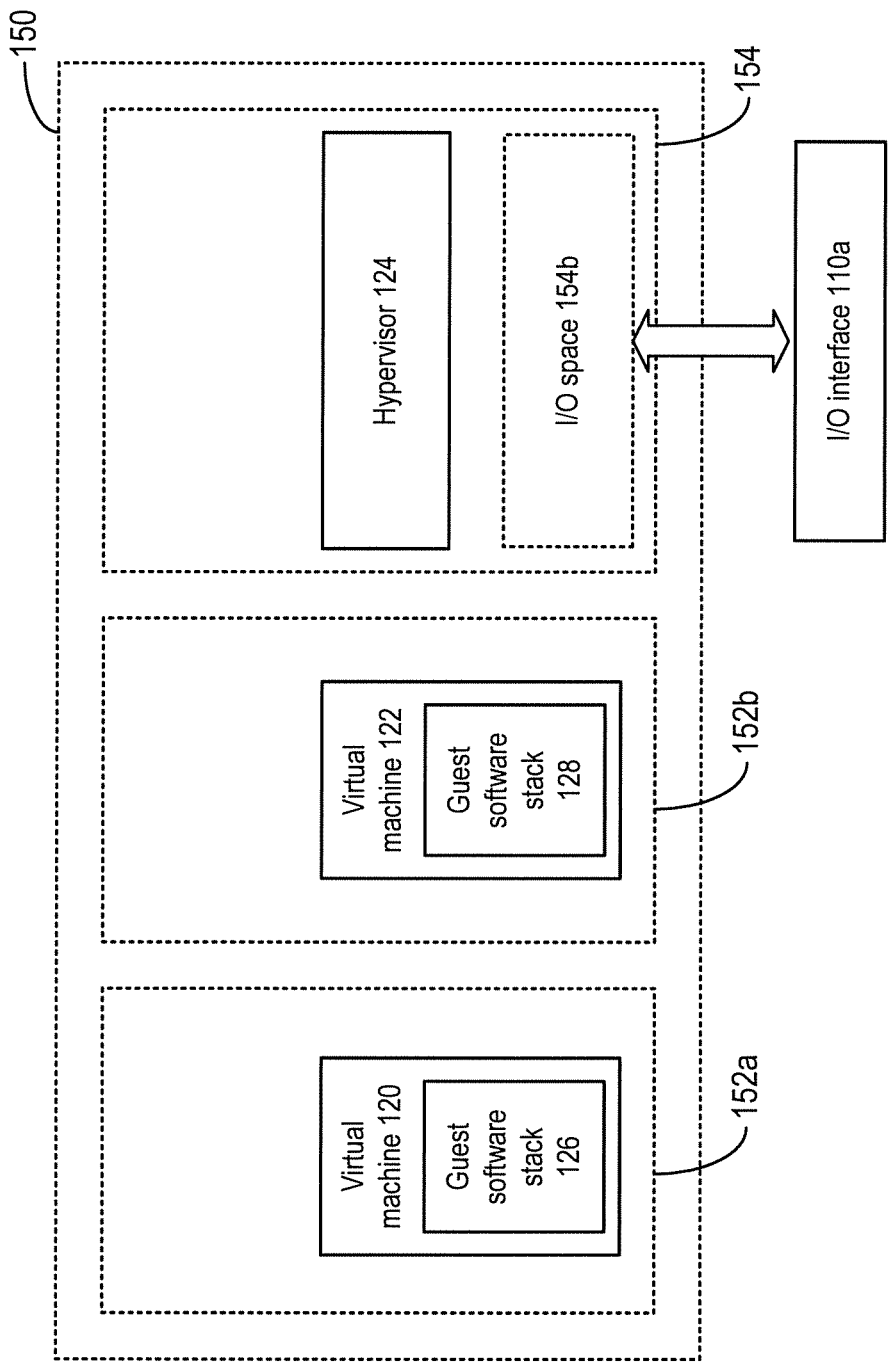

In some embodiments, each of memory devices 150 and 160 can include a region designated as a host space, and one or more regions designated as guest spaces. The host space is accessible the by hypervisors and the I/O interfaces, whereas the guest spaces are accessible by the virtual machines and the guest software stacks. Each virtual machine can be assigned a guest space, and software applications running on different virtual machines are isolated from one another. For example, referring to FIG. 1B, memory device 150 can include a guest space 152a, a guest space 152b, and a host space 154. Guest space 152a can be assigned to virtual machine 120 (as well as guest software stack 126), guest space 152b can be assigned to virtual machine 122 (as well as guest software stack 128), whereas host space 154 can be assigned to hypervisor 124 and I/O interface 110a. Although not shown in FIG. 1B, it is understood that memory device 160 can also include a set of guest spaces assigned to virtual machines 140 and 148, and a host space assigned to hypervisor 144 and I/O interface 112a.

Host space 154 further includes an I/O space 154b. I/O space 154b may be coupled with a set of hardware registers of I/O interface 110a, as a part of a memory-mapped I/O scheme. With a memory-mapped I/O scheme, data buses that are physically connected to a set of hardware registers and memory devices of an I/O interface (e.g., I/O interface 110a) can also be physical connected to a memory device of a host machine (e.g., memory device 150 of host machine 102). With such arrangements, the hardware registers and the memory device of I/O interface 110a can be accessed by memory write/read operations to I/O space 154b. The hardware registers of I/O interface 110a can store configuration information including, for example, an identifier of the I/O interface, access control information, a set of memory addresses for accessing the I/O interface, etc.

In a case where I/O interface 110a is a PCIe interface, the configuration registers may include, for example, Device Identification Register (DIR), Base Address Registers (BAR), a Notify Register, etc. BAR registers may store, for example, a set of physical addresses associated with the memory device of I/O interface 110a that is accessible via I/O space 154b. Notify Register can store a notification provided by, for example, a device driver, to start an operation at I/O interface 110a. As to be discussed in more details below, a device driver can perform memory write/read operations to I/O space 154b to store the configuration information to the hardware registers, and to store other operation information to the memory device of I/O interface 110a, to control I/O interface 110a to perform one or more operations.

In some embodiments, a hypervisor can allow a device driver operating in a guest space to directly access a configuration space assigned to an I/O interface, to configure the I/O interface to perform an operation. The hypervisor can create and store a memory mapping table that maps a set of virtual addresses in the guest space, which is accessible by the device driver, to a set of physical addresses in the configuration space. Based on the mapping, the device driver can store data at the configuration space by performing memory read/write operations to the guest space virtual addresses, to control and/or configure the I/O interface to perform an operation.

As an illustrative example, a device driver operating in virtual machine 120 can receive a packet transmission request from the chat messaging application of the guest software stack 126. The device driver can identify a location in the configuration space based on the memory mapping table, and write data related to the packet transmission request in the configuration space. The data may include, for example, a notification to I/O interface 110a to prepare for the packet transmission, and information related to the packet transmission (e.g., actual payload data, or a set of memory addresses where the payload data is stored, whether the data are for transmission or are received from the network, etc.). I/O interface 110a may monitor the configuration space and, upon detecting the notification, acquire the payload data, and then provide the payload data to network interface 110 to perform the packet transmission over network 114. After network interface 110 completes the packet transmission, it may also notify hypervisor 124 (e.g., by raising an interrupt) about the completion of the packet transmission. Hypervisor 124 may route the interrupt to the device driver of virtual machine 120, so that the device driver can handle the next packet transmission.

Figure 2A:
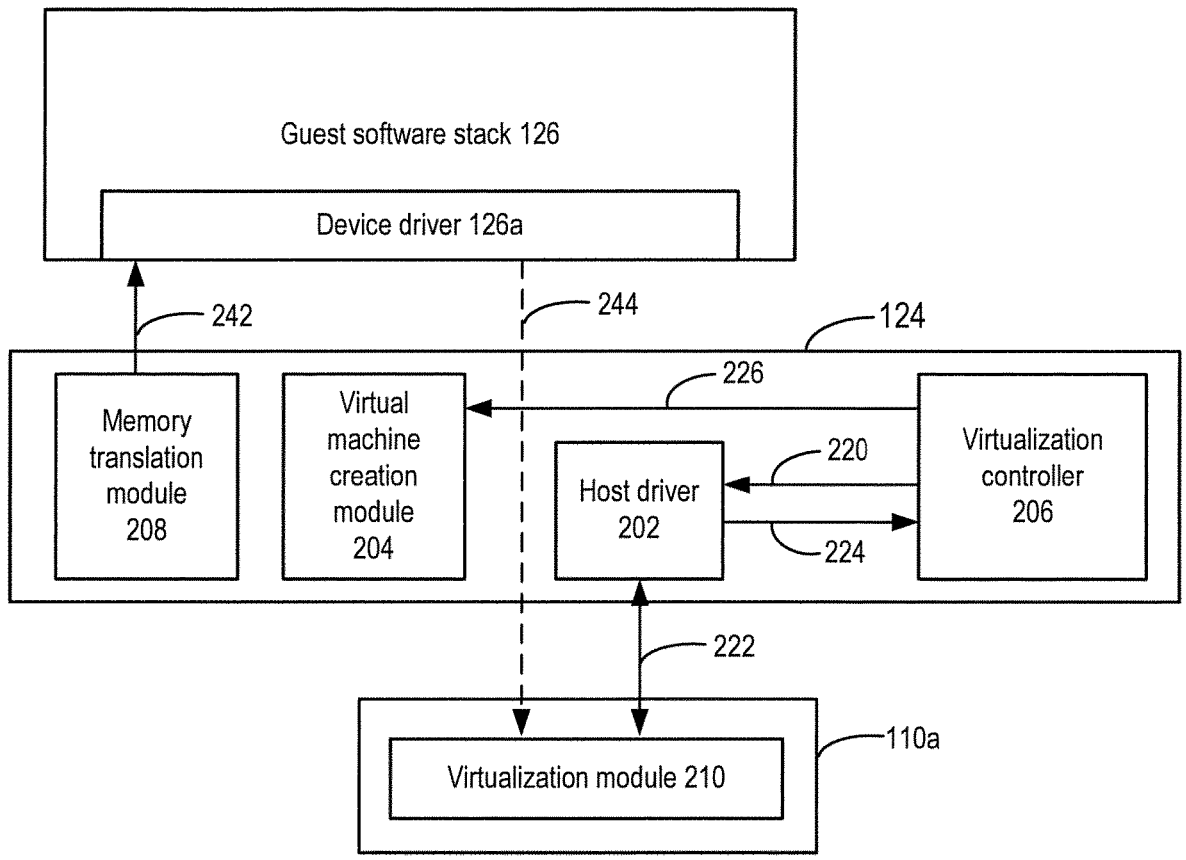
FIGS. 2A-2C are diagrams illustrating exemplary components of exemplary components of a hypervisor and an I/O interface, consistent with embodiments of the present disclosure.

Reference is now made to FIG. 2A, which illustrates exemplary components of hypervisor 124 and I/O interface 110a of FIG. 1A, consistent with embodiments of the present disclosure. As shown in FIG. 2A, hypervisor 124 includes a host driver 202, a virtual machine creation module 204, a virtualization controller 206, and a memory translation module 208. Further, I/O interface 110a includes a virtualization module 210 that interfaces with a device driver 126a (e.g., a VirtI/O Front End driver) operating in guest software stack 126. Although not shown in FIG. 2A, it is understood that hypervisor 124 of FIG. 1A may include similar components as hypervisor 124, and that I/O interface 112a may include similar components as I/O interface 110a.

Host driver 202 handles resources allocation by, for example, allocating a portion of host space 154 for I/O space 154b, Host driver 202 may execute or incorporate a software routine (e.g., mmap) to perform a memory-mapped I/O operation, to obtain a set of physical addresses in memory device 150 that are mapped to the hardware registers and the memory device of I/O interface 112a. Host driver 202 can then create I/O space 154b within host space 154, and generate a set of I/O space physical addresses.

Virtual machine creation module 204 handles virtual machine creation, which may include, for example, allocating a portion of memory device 150 to a guest space (e.g., guest spaces 152a), and providing the allocated portion to the created virtual machine (e.g., virtual machine 120), which can then use the allocated memory space to store and execute the associated guest software stack. Virtual machine creation module 204 also creates a set of virtual addresses mapped to the guest space physical addresses, and provides the guest space virtual addresses to the virtual machine, upon receiving a request from the virtual machine. Virtual machine creation module 204 also creates a mapping between another set of virtual memory addresses, which are received from virtualization controller 206, to a set of guest space physical addresses accessible to virtual machine 120. The mapping allows virtualization controller 206 to perform read/write memory operations to the guest space, hence virtualization controller 206 can monitor and/or control the memory operations performed by guest software stack 126 in the guest space.

Virtualization controller 206 can coordinate the operations of host driver 202 and virtual machine creation module 204 to also generate a mapping between the set of guest space physical addresses and the set of I/O space physical addresses, to allow the device driver of a virtual machine to directly access the I/O interface. As an illustrative example, as shown in FIG. 2A, virtualization controller 206 can, via communication 220, invoke host driver 202 to allocate a portion of host space 154 for I/O space 154b. Host driver 202 can then exchange data with I/O interface 110a, via communication 222, and map I/O space 154b to the configuration space of I/O interface 110a. For example, host driver 202 can receive the physical addresses of a memory device of I/O interface 110a, as well as information about addressing of the configuration registers of I/O interface 110a, as a part of communication 222. After creating the mapping between the physical addresses of I/O space 154b and the physical memory addresses and the configuration registers of I/O interface 110a, host driver 202 can also transmit the mapping information to I/O interface 110a via communication 222, so that I/O interface 110a can also access I/O space 154b. Host driver 202 then returns a set of I/O space physical addresses, which can be used to access I/O interface 110a, back to virtualization controller 206, via communication 224. Virtualization controller 206 then generates a set of virtual addresses (accessible by virtualization controller 206) mapped to the set of I/O space physical addresses received from host driver 202. Virtualization controller 206 then invokes virtual machine creation module 204 to create a virtual machine (e.g., virtual machine 120), via communication 226. Virtual machine creation module 204 then allocates guest space 152a, and create another mapping between a set of guest space physical addresses (associated with guest space 152a) and the set of virtual addresses accessible by virtualization controller 206.

Figure 2B:
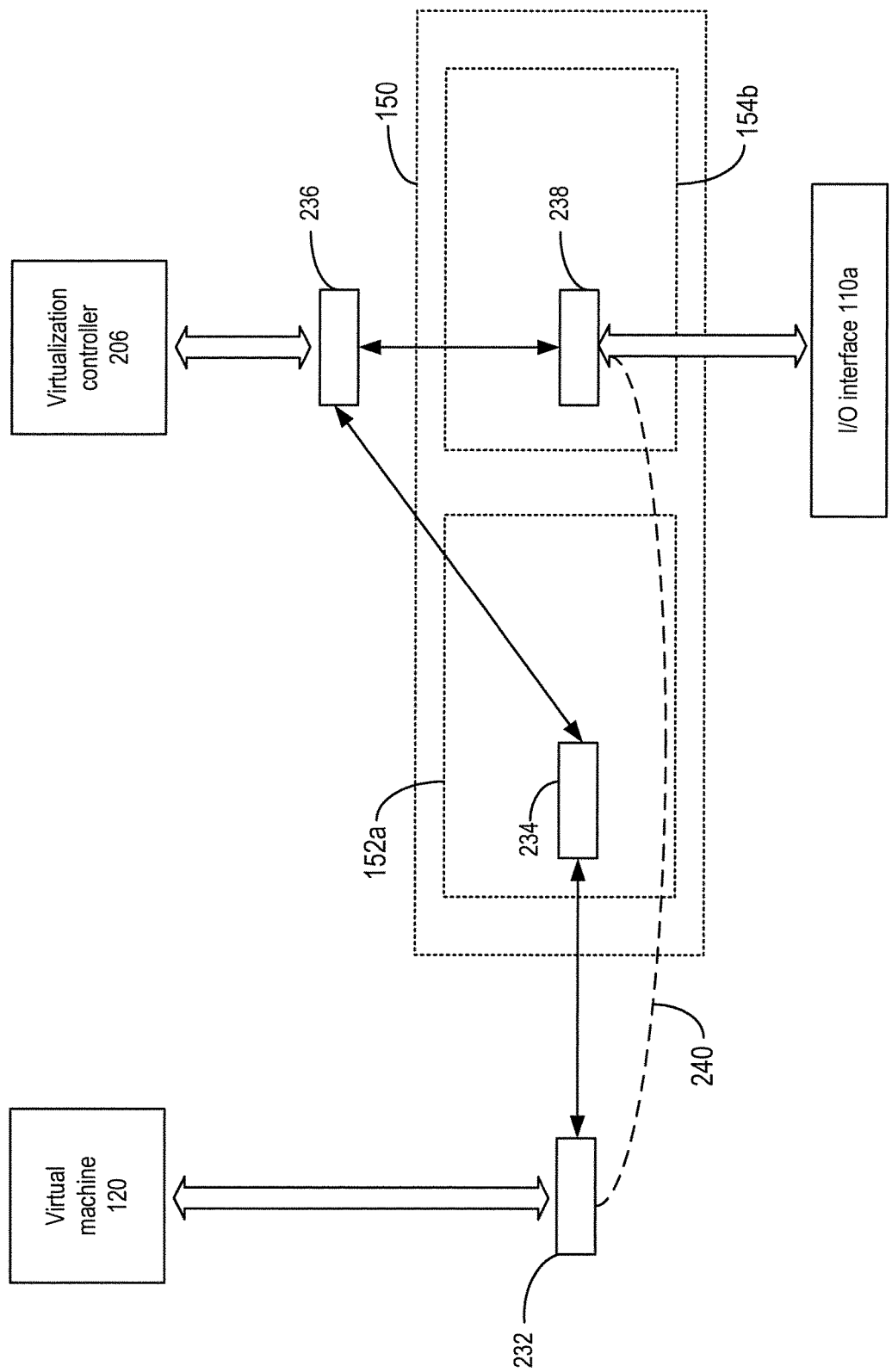

Based on the operations among host driver 202, virtual machine creation module 204, and virtualization controller 206, a mapping can be created between a set of guest space virtual addresses and a set of I/O space physical addresses. The mapping allows a virtual machine (and the device driver operating in it) to directly access the configuration registers of the I/O interface. An example of the mapping is illustrated in FIG. 2B. As shown in FIG. 2B, a guest space virtual address 232 is mapped to a guest space physical memory address 234 (within guest space 152a), after virtual machine creation module 204 creates virtual machine 120. Guest space physical memory address 234 is also mapped to a host space virtual address 236 accessible by virtualization controller 206. Host space virtual address 236 is also mapped to an I/O space physical address 238 provided by host driver 202. Based on these mappings (which can be in the form of mapping tables), a direct mapping 240 between guest space virtual address 232 and I/O space physical address 238 can be formed. Memory translation module 208 can store direct mapping 240 by, for example, storing a mapping table that maps guest space virtual address 232 to I/O space physical address 238.

In some embodiments, the mapping table can be in the form of, for example, Extended Page Table (EPT). Virtualization controller 206 can include components of a Quick Emulator (QEMU), whereas virtual machine creation module 204 can also include components of a kernel-based virtual machine (KVM), and can provide access to the EPT. With KVM, the EPT can be updated based on a VM_Exit event. For example, after virtual machine 120 is created, and device driver 126a attempts to access a guest space virtual memory address that is either not yet allocated or not yet mapped to an I/O space physical address, an EPT fault may arise. The EPT fault may lead to an exit event of virtual machine 120 (e.g., a VM_exit event), which in turn can cause the KVM to create a mapping between the guest space memory virtual address (being accessed by the device driver) to a guest space physical address that has been mapped to an I/O physical space address. The creation of the mapping can result in a new direct mapping between the guest space virtual address and the I/O space physical address. KVM can then update the EPT to include the new direct mapping. After restarting virtual machine 120, device driver 126a can then access the EPT to obtain the direct mapping, and access the I/O space by performing memory read/write operations to the guest space virtual addresses mapped to the I/O space.

Although FIG. 2A depicts memory translation module 208 as a part of hypervisor 124, it is understood that memory translation module 208 can also be a separate component from hypervisor 124. Moreover, memory translation module 208 can also be accessed by an input-output memory management unit (IOMMU).

Referring back to FIG. 2A, device driver 126a can obtain the direct mapping from memory translation module 208 via communication 242. Based on the direct mapping, device driver 126a can obtain a set of guest space virtual addresses that are mapped to a set of I/O space physical addresses. Device driver 126a can perform memory write operations to the set of guest space virtual addresses to store a set of configuration data 244 at I/O space 154b. The configuration data 244 will also be received by virtualization module 210. Based on the configuration data, virtualization module 210 can control network interface 110 to perform one or more operations such as, for example, controlling network interface 110 to transmit data to network 114, to provide data received from network 114, etc.

Figure 2C:
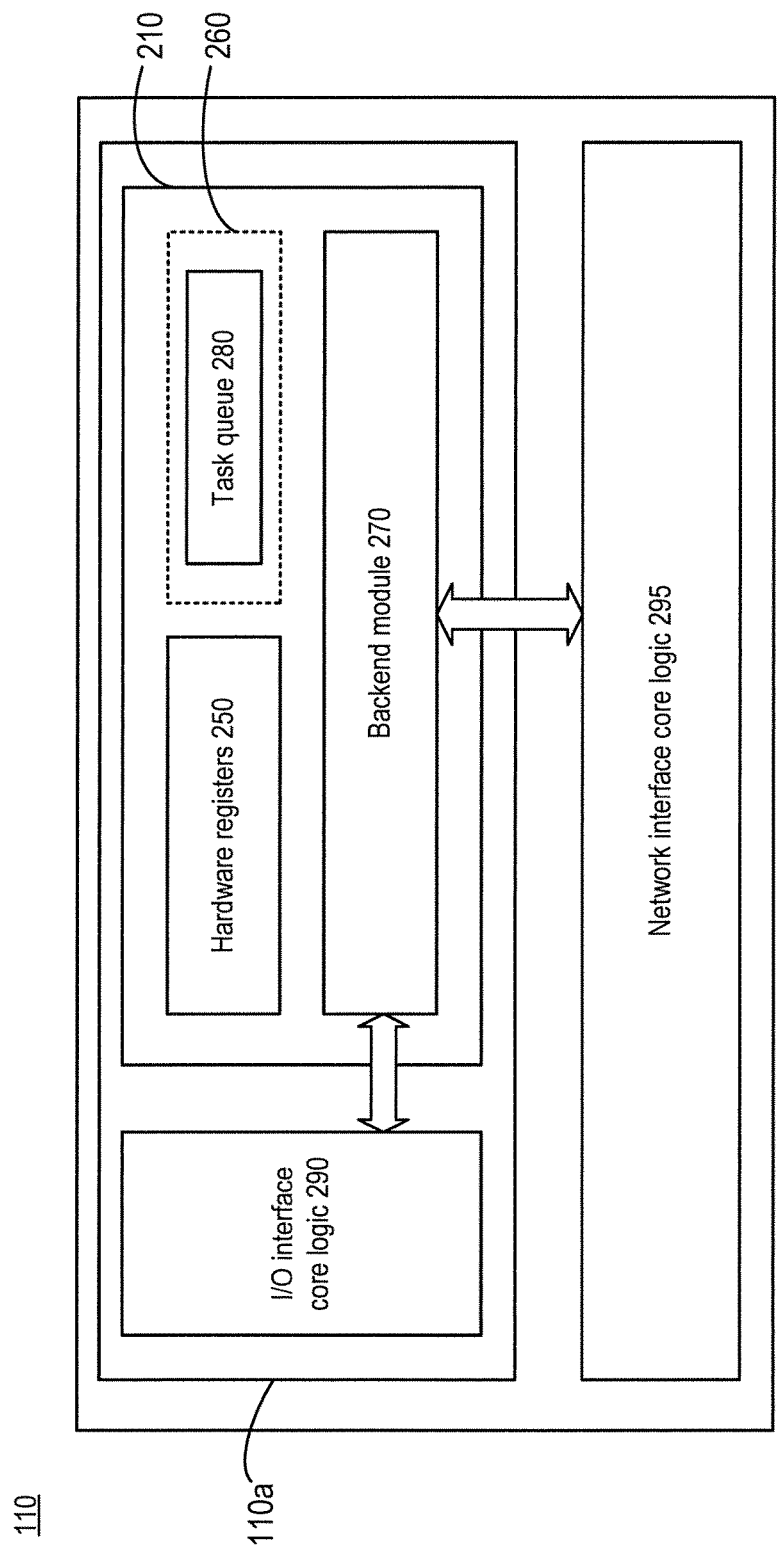

Reference is now made to FIG. 2C, which illustrates the exemplary components of network interface 110, which includes I/O interface 110a, as described above. As shown in FIG. 2C, I/O interface 110a includes virtualization module 210, which includes hardware registers 250, a memory device 260, and a backend module 270. Memory device 260 further stores a task queue 280. I/O interface 110a further comprises I/O interface core logic 290, which interfaces with backend module 270. Backend module 270 also interfaces with network interface core logic 295. These components of I/O interface 110a can be a packaged functional hardware unit designed for use with other components (e.g., portions of an integrated circuit) or a part of a program (stored on a computer readable medium) that performs a particular function of related functions. These components can be comprised of connected logic units, such as gates and flip-flops, and/or can be comprised of programmable units, such as programmable gate arrays or processors.

Hardware registers 250 may include, for example, a set of configuration registers for configuring the operations of I/O interface 110a. In a case where I/O interface 110a is a PCIe interface, the configuration registers may include, for example, Device Identification Register (DIR), Base Address Registers (BAR), Notify Register, etc. Task queue 280 may store information related to a set of tasks to be performed by I/O interface 110a (and network interface 110). The information stored may include, for example, a type of the operation (e.g., whether it is for a transmission of data packets to network 114, for reception of data packets from network 114, etc.), a set of guest space virtual addresses for storing the data (in a case where the data is to be transmitted to network 114), or for retrieving the data (in a case where the data is received from network 114), and a virtual machine identifier associated with the operation. In some embodiments, task queue 280 can be configured as Virtqueue, a VRING table, etc.

As discussed above, both hardware registers 250 and task queue 280 can be mapped and accessible by a device driver operating in a virtual machine (e.g., device driver 126a), via I/O space 154b. The device driver can obtain memory mapping information from BAR registers by accessing the portion of I/O space 154b that is mapped to the BAR registers, to obtain a set of host space physical addresses that are mapped to the locations of memory device 260 where task queue 280 are stored. The device driver can then submit a request to memory translation module 208 to translate the host space physical addresses to a set of guest space virtual addresses, and access task queue 280 by performing memory read operations to the set of guest space virtual addresses. The device driver can also submit memory translation requests to memory translation module 208 to obtain the set of guest space virtual memory addresses to access hardware registers 250.

Backend module 270 can interface with hardware registers 250, task queue 280, I/O interface core logic 290, and network interface core logic 295 to handle the aforementioned data packet transmission or reception tasks. To proceed with a data packet transmission task, the device driver can update task queue 280 by inserting a new data packet transmission task in the task queue. The task is also associated with a set of guest space virtual addresses where the data to be transmitted are stored. As discussed above, the guest space virtual addresses can be mapped to I/O space 154b, and the device driver operating in virtual machine 120 may directly store data in I/O space 154b by performing memory write operations using the guest space virtual addresses mapped to I/O space 154b. After storing the data in I/O space 154b, the device driver can also access hardware registers 250 (via I/O space 154b) and write into the Notify Register, to notify backend module about the data packet transmission task.

After detecting the write activity at the Notify Register, backend module 270 can retrieve the new data packet transmission task from task queue 280, and obtain the set of guest space virtual addresses associated with the task. Backend module 270 may submit a request to memory translation module 208 (e.g., via IOMMU) to translate the guest space virtual addresses to, for example, a set of I/O space physical addresses (e.g., of I/O space 154b). Based on the translated I/O space physical addresses, backend module 270 can perform memory read operations to obtain the data to be transmitted from virtual machine 120. Backend module 270 may provide the data to I/O interface core logic 290 for additional processing (e.g., to perform 8b/10b encoding, etc.), and then provide the processed data to network interface core logic 295. Network interface core logic 295 can then generate data packets based on the processed data, and release the data packets to network 114. After receiving a notification from network interface core logic 295 that the data packet transmission has been completed, backend module 270 can notify the device driving operating in virtual machine 120 (e.g., by raising an interrupt) about the completion. The notification can be transmitted directly to virtual machine 120 (e.g., by writing data related to the interrupt to a guest memory space accessible by the virtual machine), or to virtualization controller 206, which then writes data related to the interrupt to the guest memory space, to notify the device driver about the completion.

On the other hand, to handle a data packet reception, backend module 270 may receive data extracted from a received data packet from network interface core logic 295. Backend module 270 can determine, from task queue 280, that there is a pending data packet reception task at the top of the queue, and that the received data packet is for that pending data packet reception task. Backend module 270 can also obtain a set of guest space virtual addresses associated with the pending data packet reception task from task queue 280, and submit a request to IOMMU to translate the guest space virtual addresses to a set of I/O space physical addresses in I/O space 154b. Backend module 270 can also provide the received packet data to I/O interface core logic 290 for additional processing (e.g., to perform 8b/10b decoding, etc.), and then perform memory write operations using the set of I/O space physical addresses to store the processed data in I/O space 154b. Backend module 270 can also notify the device driver operating in virtual machine 120 (e.g., device driver 126a) about the received packet data by, for example, raising an interrupt. Upon receiving the notification, the device driver can obtain the guest space virtual addresses from the pending data packet reception task at the top of queue 280, and perform a memory read operation to obtain the received packet data.

Figure 3:
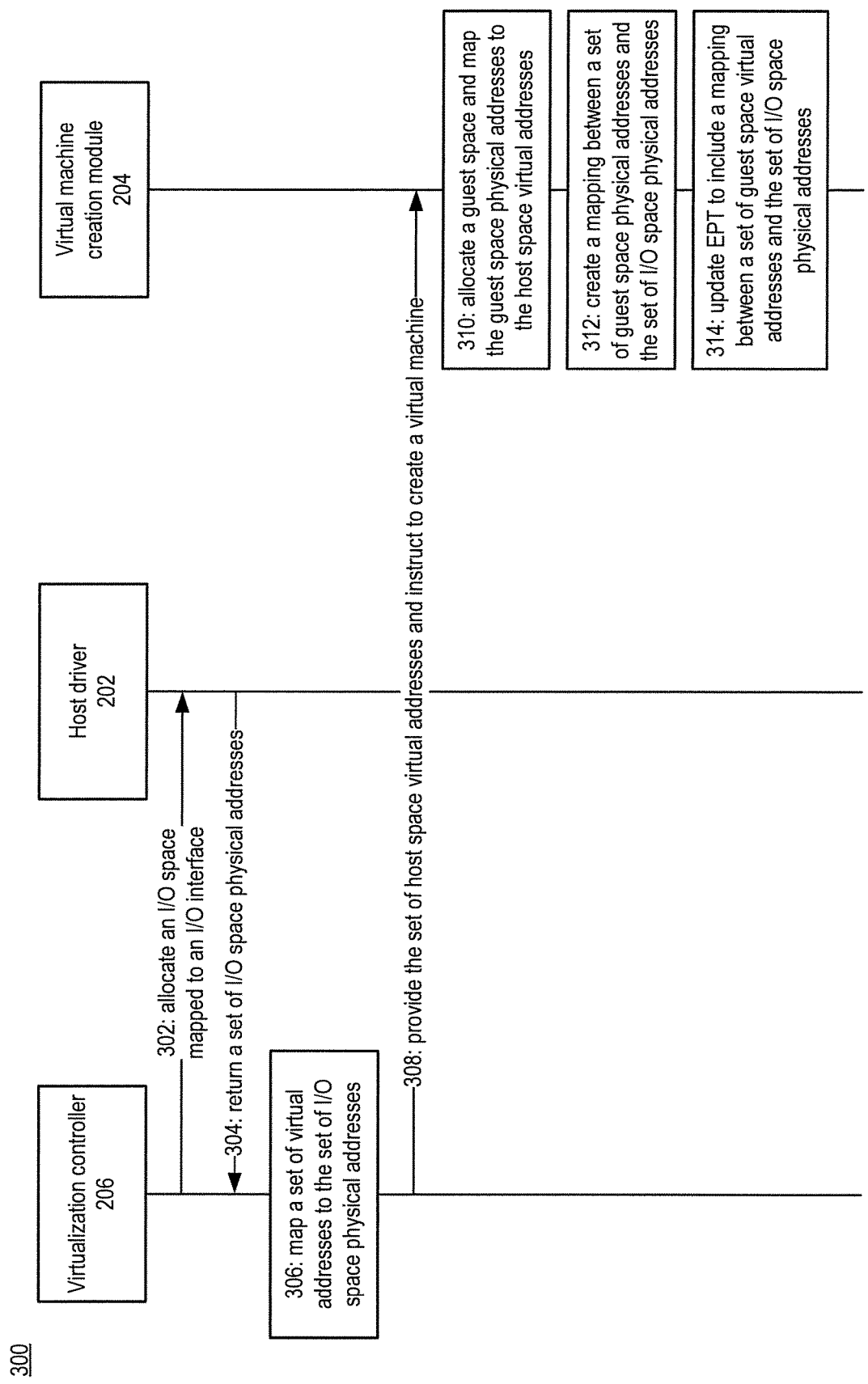
FIG. 3 is a flow diagram illustrating an exemplary method of providing a virtual machine access to a hardware device, consistent with embodiments of the present disclosure.

Reference is now made to FIG. 3, which illustrates an exemplary method 300 of providing a virtual machine access to a hardware device, consistent with embodiments of the present disclosure. The method can be performed by, for example, hypervisor 124 in conjunction with guest software stack 126 and virtualization module 210 of FIG. 2A.

After an initial start, virtualization controller 206 instructs host driver 202 to allocate a portion of memory device 150 accessible by hypervisor 124 (e.g., host space 154), and map the allocated portion of memory device 150 to the hardware registers and the memory device of I/O interface 110a, in step 302. After receiving the instruction from virtualization controller 206, host driver 202 allocates an I/O space mapped to I/O interface 110a (e.g., I/O space 154b), and returns a set of I/O space physical addresses, in step 304. After receiving the set of physical addresses mapped to the hardware registers and the memory device of I/O interface 110a, the virtualization controller 206 generates a set of virtual addresses accessible by the virtualization controller, and maps the set of virtual addresses to the set of physical addresses received from host driver 202, in step 306. Virtualization controller 206 then provide the set of host space virtual addresses to virtual machine creation module 204, and instructs virtual machine creation module 204 to create a virtual machine, in step 308.

Virtual machine creation module 204 allocates a guest space (e.g., guest space 152a) from memory device 150, and creates a mapping between a set of guest space physical memory addresses (associated with guest space 152a) and the set of host space virtual addresses (received from virtualization controller 206 and mapped to I/O space 154b), in step 310. Based on the mapping between the set of virtual addresses received from virtualization controller 206 and the I/O space physical addresses, virtual machine creation module 204 also creates a mapping between the set of guest space physical memory addresses and the I/O space physical addresses, in step 312. Virtual machine creation module 204 can generate a set of guest space virtual addresses mapped to the set of guest space physical addresses that have already been mapped to the I/O space physical addresses, and create or update an Extended Page Table (EPT) including a direct mapping between the set of guest space virtual addresses and the I/O space physical addresses, in step 314.

The generation of guest space virtual addresses can be due to an event (e.g., VM_exit) caused by a virtual machine attempting to access a guest space virtual address that does not exist or is not yet mapped to the I/O space. The EPT can be stored in, for example, memory translation module 208.

Based on the direct mapping of the EPT, a device driver operating in a virtual machine can access the hardware registers and memory device of I/O interface 110a by performing one or more memory read/write operations, to control the operations of the I/O interface.

Figure 4:
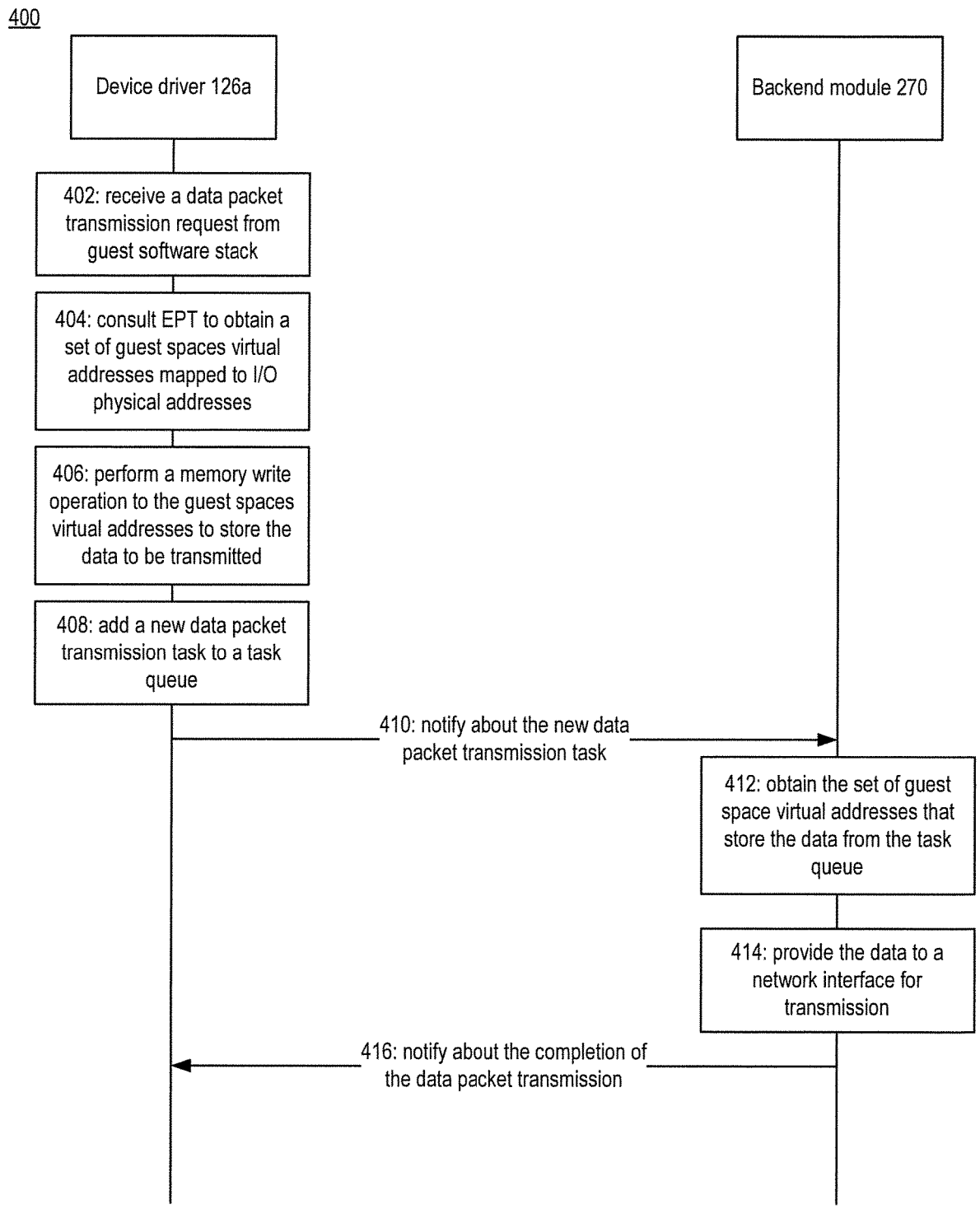
FIG. 4 is a flow diagram illustrating an exemplary method of operating a hardware device with a virtual machine, consistent with embodiments of the present disclosure.

Reference is now made to FIG. 4, which illustrates an exemplary method 400 of operating a hardware device with a virtual machine, consistent with embodiments of the present disclosure. The method can be performed by, for example, device driver 126a operating in virtual machine 120 and I/O interface 110a of FIG. 1A.

After an initial start, a device driver (e.g., device driver 126a) may receive a data packet transmission request from a software application that is a part of guest software stack 126, in step 402. The device driver consults the EPT and obtains a set of guest spaces virtual addresses mapped to I/O space physical addresses, in step 404. The device driver performs a memory write operation to the guest spaces virtual addresses to store the data to be transmitted, in step 406. The device driver then performs a memory write operation to add a new data packet transmission task to task queue 280, in step 408. The memory write operation includes, for example, associating the new data transmission task with the set of guest spaces virtual addresses that store the data to be transmitted. The device driver further writes to a Notify Register of I/O interface 110a to notify the interface about the new data packet transmission task, in step 410. The device driver accesses task queue 280 and the Notify Register (of hardware registers 250) based on the direct mapping between the guest space virtual addresses and the I/O space physical addresses stored in EPT.

After detecting the writes to the Notify Register, backend module 270 can retrieve the new data packet transmission task from task queue 280, and obtain the set of guest space virtual addresses associated with the task, in step 412. Backend module 270 may submit a request to memory translation module 208 (e.g., via IOMMU) to translate the guest space virtual addresses to, for example, a set of I/O space physical addresses (e.g., of I/O space 154b). Based on the translated I/O space physical addresses, backend module 270 can perform memory read operations to obtain the data to be transmitted from virtual machine 120, and provide the data to a network interface for transmission, in step 414. After receiving a notification from the network interface that the data packet transmission has been completed, backend module 270 can notify the device driving operating in virtual machine 120 about the completion, in step 416. The notification can be in the form of an interrupt.

Figure 5:
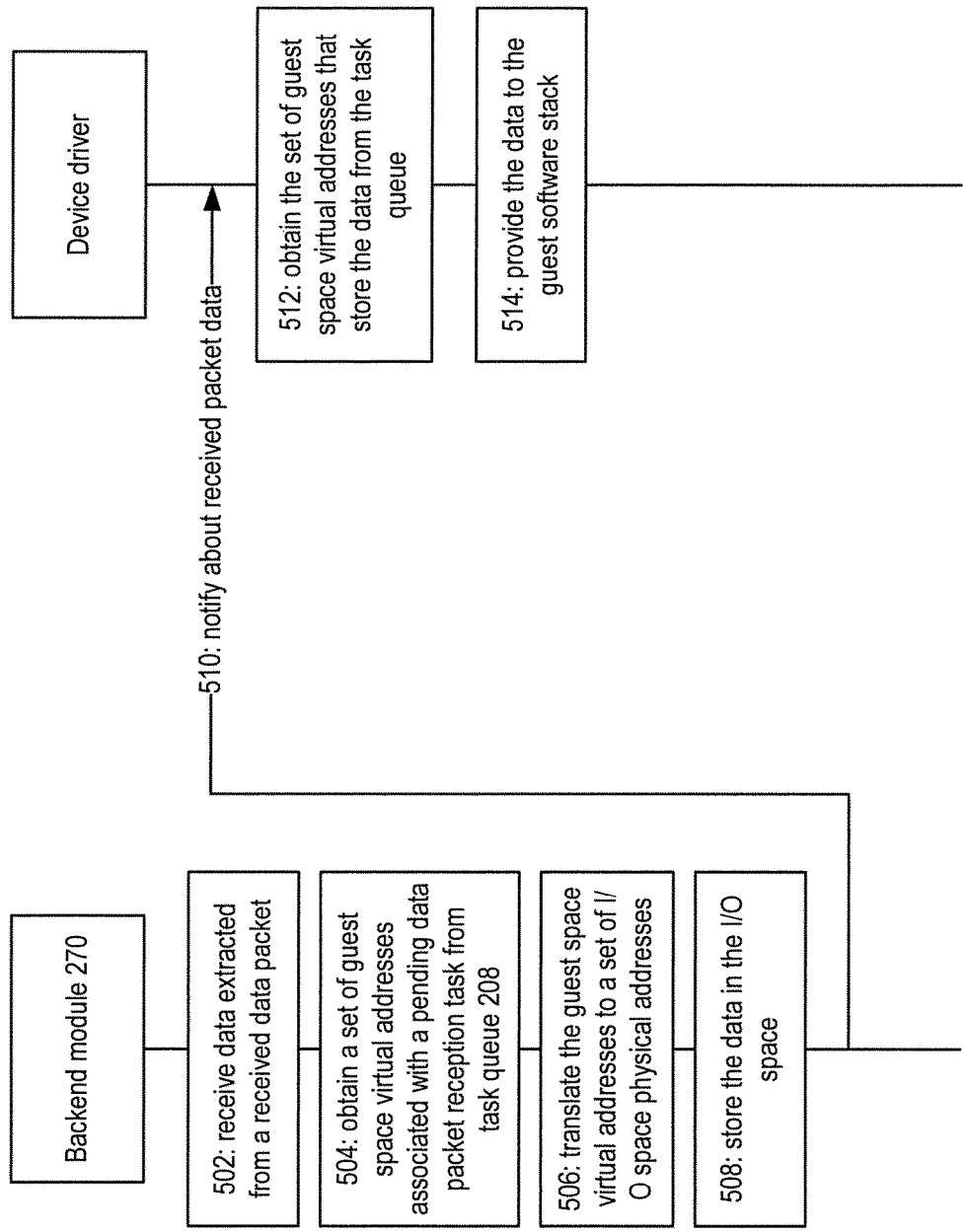
FIG. 5 is a flow diagram illustrating another exemplary method of operating a hardware device with a virtual machine, consistent with embodiments of the present disclosure.

Reference is now made to FIG. 5, which illustrates an exemplary method 500 of performing network packet reception with a virtual machine, consistent with embodiments of the present disclosure. The method can be performed by, for example, a device driver operating in virtual machine 120 and I/O interface 110a of FIG. 1A.

After an initial start, backend module 270 receives, from the network interface, data extracted from a received data packet, in step 502. Backend module 270 can obtain a set of guest space virtual addresses associated with a pending data packet reception task from task queue 280, in step 504. Back end module 270 can translate the guest space virtual addresses to a set of I/O space physical addresses (e.g., in I/O space 154b), in step 506. The translation can be performed by, for example, submitting a request to IOMMU. Backend module 270 can perform memory write operations using the set of I/O space physical addresses to store the data in the I/O space, in step 508. Backend module 270 can notify the device driver operating in virtual machine 120 (e.g., by raising an interrupt) about the received packet data, in step 510. Upon receiving the notification, the device driver can obtain the guest space virtual addresses from the pending data packet reception task in queue 280, in step 512. The device driver then performs a memory read operation to obtain the received packet data, and provide the received packet data to guest software stack 126, in step 514.

Figure 6:
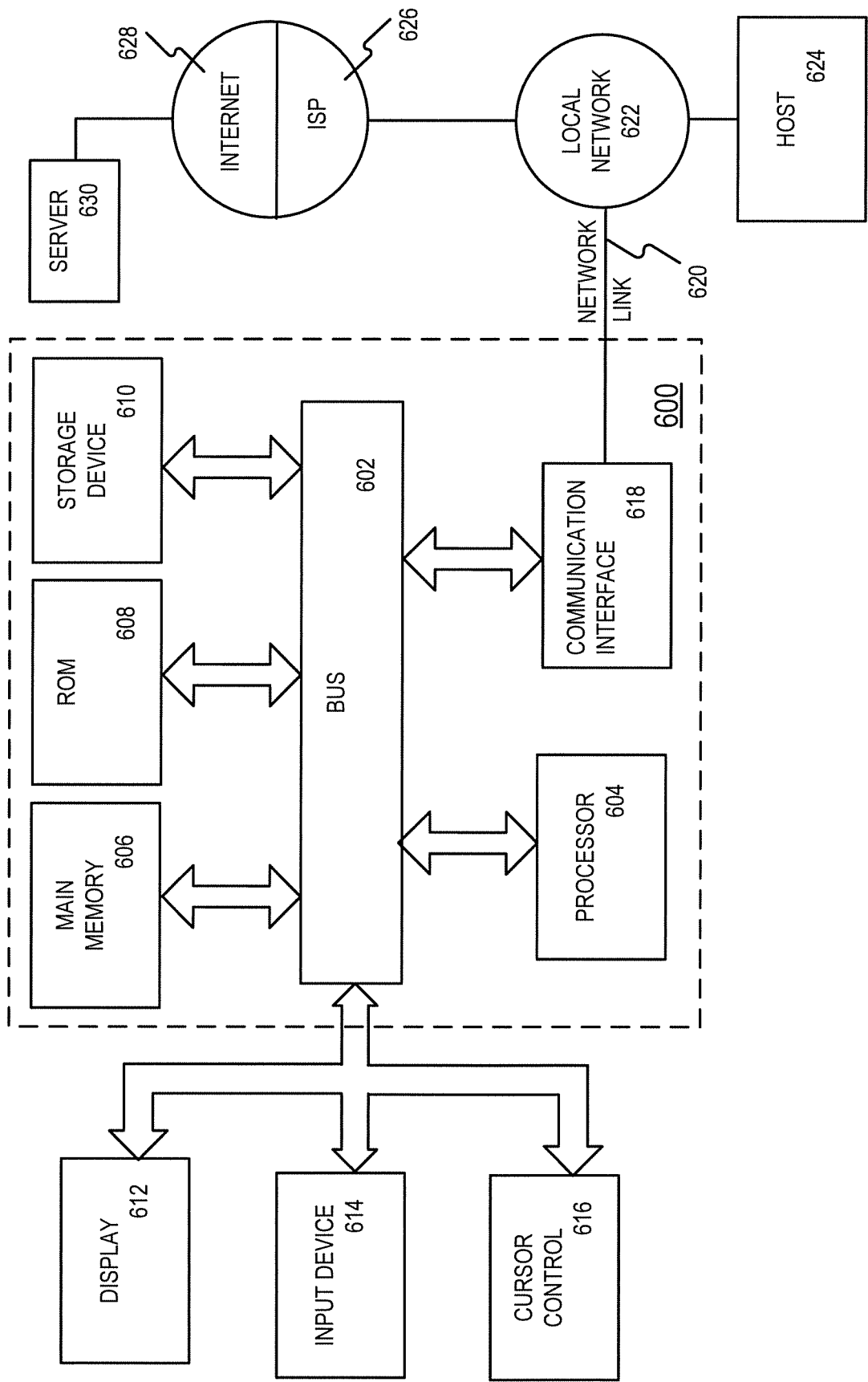
FIG. 6 is a block diagram illustrating an exemplary computer system on which embodiments described herein can be implemented.

FIG. 6 is a block diagram of an exemplary computer system 600 with which embodiments described herein can be implemented. Computer system 600 includes a bus 602 or other communication mechanism for communicating information, and one or more hardware processors 604 (denoted as processor 604 for purposes of simplicity) coupled with bus 602 for processing information. Hardware processor 604 can be, for example, one or microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, after being stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 can be coupled via bus 602 to a display 612, such as a cathode ray tube (CRT), an liquid crystal display (LCD), or a touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 600 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables. The modules may include, for example, components of hypervisor 124 of FIG. 2A.

Computer system 600 can implement the techniques described herein using customized hard-wired logic, one or more ASICs or FPGAs, firmware and/or program logic which in combination with the computer system causes or programs computer system 600 to be a special-purpose machine. According to some embodiments, the operations, functionalities, and techniques and other features described herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform the method steps (e.g., methods 300-500 of FIGS. 3-5) described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 610. Volatile media can include dynamic memory, such as main memory 606. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 can also include a communication interface 618 coupled to bus 602. Communication interface 618 can provide a two-way data communication coupling to a network link 620 that can be connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 can send and receive electrical, electromagnetic or optical signals that carry digital data streams representing various types of information.

Network link 620 can typically provide data communication through one or more networks to other data devices. For example, network link 620 can provide a connection through local network 622 to a host computer 624 or to data equipment operated by an Internet Service Provider (ISP) 626. ISP 626 in turn can provide data communication services through the world wide packet data communication network now commonly referred to as the "Internet" 628. Local network 622 and Internet 628 both use electrical, electromagnetic or optical signals that carry digital data streams. The signals through the various networks and the signals on network link 320 and through communication interface 618, which carry the digital data to and from computer system 600, can be example forms of transmission media.

Computer system 600 can send messages and receive data, including program code, through the network(s), network link 620 and communication interface 618. In the Internet example, a server 630 can transmit a requested code for an application program through Internet 628, ISP 626, local network 622 and communication interface 618.

The received code can be executed by processor 604 as it is received, and/or stored in storage device 610, or other non-volatile storage for later execution. In some embodiments, server 630 can provide information for being displayed on a display.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An apparatus for operating an input/output (I/O) interface in a virtual machine, comprising:
one or more memory devices that stores a set of instructions; and
one or more hardware processors configured to execute the set of instructions to cause the apparatus to:
obtain a first mapping table that maps a set of host space virtual addresses to a first set of physical addresses associated with a first portion of the one or more memory devices;
obtain a second mapping table that maps a second set of physical addresses associated with a second portion of the one or more memory devices to the set of host space virtual addresses, wherein the second portion of the one or more memory devices is accessible by a virtual machine;
generate a third mapping table that maps the second set of physical addresses to the first set of physical addresses; and
map the first portion of the one or more memory devices associated with the first set of physical addresses to a configuration space of an I/O interface, wherein the third mapping table is accessible by a device driver operating in the virtual machine and enables the device driver to directly access the configuration space of the I/O interface to control the I/O interface by performing one or more memory operations to the first portion of the one or more memory devices associated with the first set of physical addresses.

2. The apparatus of claim 1, wherein the one or more hardware processors are further configured to execute the set of instructions to provide a virtualization controller and a host driver;
  wherein the mapping of the set of host space virtual addresses to the first set of physical addresses is performed by the virtualization controller; and
  wherein the mapping of the first portion of the one or more memory devices associated with the first set of physical addresses to the configuration space of the I/O interface is performed by the host driver after receiving an indication from the virtualization controller.

3. The apparatus of claim 1, wherein the one or more hardware processors are further configured to execute the set of instructions to cause the apparatus to:
  map a set of guest space virtual addresses to the second set of physical addresses; and
  update the third mapping table to further map the set of guest space virtual addresses to the first set of physical addresses,
  wherein the updated third mapping table is accessible by the device driver,
  wherein the updated third mapping table enables the device driver to access the configuration space of the I/O interface by performing the one or more memory operations using the set of guest space virtual addresses.

4. The apparatus of claim 3, wherein the configuration space stores a task queue;
  wherein the one or more hardware processors are further configured to execute the set of instructions to cause the apparatus to:
    store, by the device driver, first data to be transmitted to a second hardware interface at a first guest space virtual address of the set of guest space virtual addresses;
    store, by the device driver, the first guest space virtual address in the task queue; and
    store, by the device driver and based on the updated third mapping table, a notification in the configuration space of a first hardware interface, to cause the first hardware interface to retrieve the first data using the first guest space virtual address and the updated third mapping table.

5. The apparatus of claim 3, wherein the configuration space stores a task queue; wherein the one or more hardware processors are further configured to execute the set of instructions to cause the apparatus to:
  receive, by the device driver from a first hardware interface, a notification that second data is received from a second hardware interface;
  responsive to receiving the notification, obtain, by the device driver, a second guest space virtual address associated with the second data from the task queue; and
  retrieve, by the device driver using the second guest space virtual address and the third mapping table, the second data.

6. The apparatus of claim 1, wherein the device driver is a VirtI/O Frontend Driver.

7. The apparatus of claim 2, wherein the virtualization controller is a QEMU (Quick Emulator).

8. The apparatus of claim 4, wherein the task queue comprises at least one of: a VRING table or a Virtqueue.

9. A method for operating an input/output (I/O) interface in a virtual machine, the method comprising:
  obtaining a first mapping table that maps a set of host space virtual addresses to a first set of physical addresses associated with a first portion of the memory device;
  obtaining a second mapping table that maps a second set of physical addresses associated with a second portion of the memory device to the set of host space virtual addresses, wherein the second portion of the memory device is accessible by a virtual machine;
  generating a third mapping table that maps the second set of physical addresses to the first set of physical addresses; and
  mapping the first portion of the memory device associated with the first set of physical addresses to a configuration space of an I/O interface,
  wherein the third mapping table is accessible by a device driver operating in the virtual machine and enables the device driver to directly access the configuration space of the I/O interface to control the I/O interface by performing one or more memory operations to the first portion of the one or more memory devices associated with the first set of physical addresses.

10. The method of claim 9, wherein the mapping of the set of host space virtual addresses to the first set of physical addresses is performed by a virtualization controller; and
  wherein the mapping of the first portion of the memory device associated with the first set of physical addresses to the configuration space of the I/O interface is performed by a host driver after receiving an indication from the virtualization controller.

11. The method of claim 9, further comprising:
  mapping a set of guest space virtual addresses to the second set of physical addresses; and
  updating the third mapping table to further map the set of guest space virtual addresses to the first set of physical addresses,
  wherein the updated third mapping table is accessible by the device driver,
  wherein the updated third mapping table enables the device driver to access the configuration space of the I/O interface by performing the one or more memory operations using the set of guest space virtual addresses.

12. The method of claim 11, wherein the configuration space stores a task queue; the method further comprising:
  storing, by the device driver, first data to be transmitted to a second hardware interface at a first guest space virtual address of the set of guest space virtual addresses;
  storing, by the device driver, the first guest space virtual address in the task queue;
  storing, by the device driver and based on the updated third mapping table, a notification in the configuration space of a first hardware interface, to cause the first hardware interface to retrieve the first data using the first guest space virtual address and the updated third mapping table.

13. The method of claim 11, wherein the configuration space stores a task queue; the method further comprising:

receiving, by the device driver from a first hardware interface, a notification that second data is received from a second hardware interface;

responsive to receiving the notification, obtaining, by the device driver, a second guest space virtual address associated with the second data from the task queue; and retrieving, by the device driver using the second guest space virtual address and the third mapping table, the second data.

14. The method of claim 9, wherein the device driver is a VirtI/O Frontend Driver.

15. A non-transitory computer readable medium that stores instructions that are executable by one or more processors of an apparatus to perform a method for operating an input/output (I/O) interface in a virtual machine, the method comprising:

obtaining a first mapping table that maps a set of host space virtual addresses to a first set of physical addresses associated with a first portion of the memory device;

obtaining a second mapping table that maps a second set of physical addresses associated with a second portion of the memory device to the set of host space virtual addresses, wherein the second portion of the memory device is accessible by a virtual machine;

generating a third mapping table that maps the second set of physical addresses to the first set of physical addresses; and mapping the first portion of the memory device associated with the first set of physical addresses to a configuration space of an I/O interface, wherein the third mapping table is accessible by a device driver operating in the virtual machine and enables the device driver to directly access the configuration space of the I/O interface to control the I/O interface by performing one or more memory operations to the first portion of the one or more memory devices associated with the first set of physical addresses.

16. The medium of claim 15, wherein the mapping of the set of host space virtual addresses to the first set of physical addresses is performed by a virtualization controller; and wherein the mapping of the first portion of the memory device associated with the first set of physical addresses to the configuration space of the I/O interface is performed by a host driver after receiving an indication from the virtualization controller.

17. The medium of claim 15, further comprising the set of instructions that is executable by the one or more processors of the apparatus to cause the apparatus to further perform:

mapping a set of guest space virtual addresses to the second set of physical addresses; and updating the third mapping table to further map the set of guest space virtual addresses to the first set of physical addresses, wherein the updated third mapping table is accessible by the device driver, wherein the updated third mapping table enables the device driver to access the configuration space of the I/O interface by performing the one or more memory operations using the set of guest space virtual addresses.

18. The medium of claim 17, wherein the configuration space stores a task queue; the method further comprising:

storing, by the device driver, first data to be transmitted to a second hardware interface at a first guest space virtual address of the set of guest space virtual addresses;

storing, by the device driver, the first guest space virtual address in the task queue;

storing, by the device driver and based on the updated third mapping table, a notification in the configuration space of a first hardware interface, to cause the first hardware interface to retrieve the first data using the first guest space virtual address and the updated third mapping table.

19. The medium of claim 17, wherein the configuration space stores a task queue; the method further comprising:

receiving, by the device driver from a first hardware interface, a notification that second data is received from a second hardware interface;

responsive to receiving the notification, obtaining, by the device driver, a second guest space virtual address associated with the second data from the task queue; and retrieving, by the device driver using the second guest space virtual address and the third mapping table, the second data.

20. The medium of claim 15, wherein the device driver is a VirtI/O Frontend Driver.

* * * * *